United States Patent [19]
Gregg et al.

[11] 3,886,482
[45] May 27, 1975

[54] TRAVELING WAVE LASER SYSTEM

[75] Inventors: David W. Gregg, LaFayette; Ray E. Kidder, Pleasanton; Arthur T. Biehl, Diablo, all of Calif.

[73] Assignee: The United States of America as represented by the United States Energy Research and Development Administration, Washington, D.C.

[22] Filed: Sept. 19, 1973

[21] Appl. No.: 398,888

Related U.S. Application Data

[63] Continuation of Ser. No. 65,758, June 22, 1970, abandoned.

[52] U.S. Cl. .................. 331/94.5 G; 331/94.5 PE; 331/94.5 C; 330/4.3
[51] Int. Cl. ........................ H01s 3/09; H01s 3/02
[58] Field of Search... 330/4.3; 331/94.5 PE, 94.5 G

[56] References Cited
UNITED STATES PATENTS
3,513,402  5/1970  Harrison ............................ 330/4.3
3,673,513  6/1972  Gregg et al. ................. 331/94.5 PE

OTHER PUBLICATIONS
Shipman, "Traveling Wave Excitation of High Power Gas Lasers," 1/1/67, pp. 3-4, A.P.L., Vol. 10, No. 1; H01s3.
Spencer et al., "Comparison of HFDF . . . Power," 5/15/70, pp. 384-385, A.P.L., Vol. 16, No. 10.

*Primary Examiner*—Maynard R. Wilbur
*Assistant Examiner*—N. Moskowitz
*Attorney, Agent, or Firm*—John A. Horan; F. A. Robertson; L. E. Carnahan

[57] ABSTRACT

A method and means for generating a traveling wave laser pulse of almost unlimited energy content wherein a gain medium is pumped into a traveling wave mode, the traveling wave moving at essentially the velocity of light to generate an amplifying region or zone which moves through the medium at the velocity of light in the presence of directed stimulating radiation, thereby generating a traveling coherent, directed radiation pulse moving with the amplification zone through the gain medium.

26 Claims, 9 Drawing Figures

INVENTORS
DAVID W. GREGG
BY RAY E. KIDDER
ARTHUR T. BIEHL

INVENTORS
DAVID W. GREGG
BY RAY E. KIDDER
ARTHUR T. BIEHL

ATTORNEY

TRAVELING WAVE LASER SYSTEM

This is a continuation of application Ser. No. 65,758, filed June 22, 1970 and now abandoned.

BACKGROUND OF THE INVENTION

The invention described herein was made in the course of, or under, Contract No. W–7405–Eng–48, with the U.S. Atomic Energy Commission.

This invention relates to laser systems, particularly to high energy pulsed laser systems, and more particularly to a method and means for generating a traveling wave laser pulse of almost unlimited energy content.

Single pass laser systems are known in the art and are generally analogous to single pass light amplifier systems wherein a stimulating light pulse is passed once through a gain medium for amplification by stimulated emission. As known, a gain medium is a medium capable of having a population inversion in energy states which can be discharged by stimulated emission radiation transitions. Population inversion refers to a condition in matter where a greater number of its constituents are in excited higher energy states than in unexcited lower energy states.

For significnat energy amplification in a conventional single pass laser system, a high degree population inversion in the gain medium is required in order to obtain a useful amount of energy per unit volume stored in the gain medium. In addition, a very high degree population inversion in the gain medium is necessary where high energy, fast rise time laser pulses are desired.

Until recently, in order to get the desired degree of population inversion for high energy amplification of a stimulating radiation pulse, it has been necessary to pump the entire gain medium simultaneously. In prior large laser systems, a high degree population inversion could not be maintained because of "super-radiance" in the gain medium, i.e., spotnaneous lasing emissions in random directions at random times. Accordingly, a substantial amount of energy which could otherwise be available for a desired laser pulse is lost from the system.

Recently, it was discovered that an extremely high degree population inversion can be generated by utilizing a high energy electron beam or an intense light to trigger a large magnitude energy release or discharge suitable for pumping a gain medium, this being described and claimed in copending U.S. patent application Ser. No. 40,652, filed May 26, 1970, entitled "Electron Beam-Initiated Chemical Laser System," assigned to the same assignee, issued as U.S. Pat. No. 3,673,513 on June 27, 1972. Also, copending U.S. patent application Ser. No. 40,653, filed May 26, 1970, entitled "High Energy Chemical Laser System," issued as U.S. Pat. No. 3,623,145 on Nov. 23, 1971, describes and claims an exothermic chemical reaction produced when specified explosive gaseous mixtures are triggered by an electron beam or intense light source to generate a high degree population inversion. According to these above referenced recent advances in the state of the art, a suitable exothermic chemical lasing reaction must have the following properties: (1) a lasing reaction species or product; (2) an energy release suitable for pumping that species or product; (3) a rate of energy release sufficient to generate an extremely large population inversion in that lasing species or product; (4) a reaction capable of uniform, controllable initiation; and (5) a total chemical energy release in a time comparable to the required time-width for the generated, stimulated radiation emission pulse. Other desirable properties of such exothermic lasing chemical reactions include low initial energy investment for initiation, gaseous reaction products, and complete reaction of reactants once initiated.

SUMMARY OF THE INVENTION

The present invention broadly involves a method and means for generating a traveling wave laser pulse and is basically analogous to a single pass light amplifier system. However, this invention provides a traveling wave laser pulse of almost unlimited energy content, wherein a gain medium is pumped in a traveling wave mode, the traveling wave moving at essentially the velocity of light to generate an amplifying region or zone which moves through the medium at the velocity of light in the presence of directed stimulating radiation, thereby generating a traveling coherent, directed radiation pulse moving with the amplification zone through the gain medium.

One embodiment of the invention utilizes a high energy electron beam or intense light source triggering a large magnitude energy release or discharge in or into a gain medium which progresses at the velocity of light through the medium in a traveling wave mode defining an energy release or discharge region in the medium which moves at the velocity of light. Another embodiment of the invention encompasses a method and means for generating a fast rise time traveling wave laser pulse, utilizing an exothermic chemical reaction initiated at the velocity of light in a traveling wave mode, this embodiment fulfilling the above stated required and desired properties of a suitable exothermic chemical laser reaction. Another embodiment involves the method and means for generating a fast rise time traveling wave laser pulse with a gaseous gain medium disposed in a large traveling wave electrical discharge. In addition, the invention embodies a method and means for aligning a high energy traveling wave laser pulse system, wherein a continuous wave laser device generates a visible light beam, which, by means of beam splitters, is combined into the beam path of an oscillator laser which generates the stimulating radiation pulse, whereby the system can be aligned by visual examination.

Therefore it is an object of this invention to provide a traveling wave laser pulse system.

A further object of the invention is to provide a method and means for generating a traveling wave laser pulse of almost unlimited energy content.

Another object of the invention is to provide a traveling laser pulse wherein a gain medium is pumped in a traveling wave mode, the traveling wave moving at essentially the velocity of light to generate an amplifying region or zone which moves through the medium at the velocity of light in the presence of directed stimulating radiation, thereby generating a traveling coherent, directed radiation pulse moving with the amplification zone through the gain medium.

Another object of the invention is to provide a traveling wave laser pulse system utilizing an exothermic chemical reaction initiated at the velocity of light in a traveling wave mode.

Another object of the invention is to provide a traveling wave laser pulse system which utilizes a high energy electron beam initiation technique.

Another object of the invention is to provide a fast rise time traveling wave laser pulse system, which utilizes a gaseous gain medium disposed in a large traveling wave electrical discharge.

Another object of the invention is to provide a method and means for aligning a high energy traveling wave laser pulse system.

Other objects of the invention will become readily apparent from the following description and accompanying drawings.

DESCRIPTION OF THE DRAWINGS

FIG. is a graphical representation of a linear time scale showing the coincidence of the population inversion zone in a gain medium, and the stimulating radiation wave front.

DESCRIPTION OF THE INVENTION

Prior to the detailed description of the invention and embodiments illustrated for carrying out the inventive concept, a more generalized description of the embodiments is first set forth as follows:

A first embodiment of the invention utilizes a high energy electron beam or intense light source triggering a large magnitude energy release or discharge in or into a gain medium which progresses at the velocity of light through the medium in a traveling wave mode defining an energy release or discharge region in the medium which moves at the velocity of light. The energy release or discharge region creates a light amplification zone of population inversion in the gain medium. Stimulating radiation is introduced into and directed to move with this zone to stimulate a traveling coherent, directed radiation pulse moving with this zone through the gain medium. The radiation pulse is amplified to an extremely high energy level by stimulated radiation transitions in the amplification zone as it moves through the gain medium. The timewidth of the pulse is comparable to the light transit time across the zone.

A second embodiment encompasses a method and means for generating a fast rise time traveling wave laser pulse of almost unlimited energy, utilizing an exothermic chemical reaction initiated at the velocity of light in a traveling wave mode. The class of suitable chemical reactions for this application are those which have a lasing reaction species or product; which release energy suitable for pumping that lasing species at a sufficient rate to generate an extremely large population inversion in a time interval comparable to the timewidth of the desired stimulated radiation emission pulse; and which can be volumetrically initiated in a traveling wave mode by a high energy electron beam, an electrical discharge, or an intense radiation field, the traveling wave moving at the velocity of light. A traveling initiation wave creates an amplification zone of population inversion in the lasing species, the zone moving at the velocity of light. This embodiment includes a method and means for introducing a pulse of stimulating radiation into the zone and directing it to move with the zone. The pulse can be amplified in this manner to very high energies by stimulating, radiative transitions of the lasing species. The timewidth of the generated pulse is comparable to the time-width of the moving amplification zone.

A third embodiment relates to a method and means for generating a fast rise time traveling wave laser pulse of almost unlimited energy, with a gaseous gain medium disposed in a large traveling wave electrical discharge. A high energy electron beam triggers a large magnitude electrical energy discharge moving through the gaseous gain medium in a traveling wave mode at the velocity of light. The energy discharge generates an amplification zone in the lasing energy levels of the gain medium, which moves at the velocity of light through the medium. The invention includes a method and means for introducing a stimulating radiation pulse into the amplification zone and directing it to move with the zone, whereby the stimulating radiation pulse is amplified to an extremely high energy level by stimulating, radiative transitions from the lasing energy levels of the gain medium.

In addition the invention relates to a method and means for aligning a high energy traveling wave laser pulse system, wherein a continuous wave laser device generates a visible light beam which, by means of beam splitters, is combined into the beam path of an oscillator laser which generates the stimulating radiation pulse, whereby the system can be aligned by visual examination.

Figure 1:
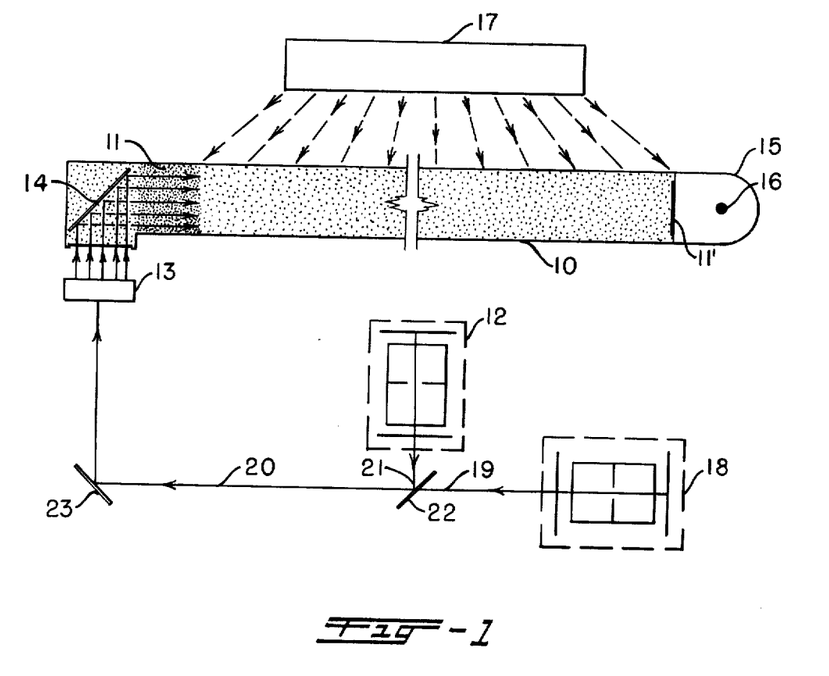
FIG. 1 is a schematic illustration of an embodiment of the invention and includes the alignment system therefor.

Referring now to the FIG. 1 embodiment of the inventive traveling wave pulse laser system, the basic components comprises a longitudinal amplifier 10 containing a high gain medium 11, a conventional oscillator laser system 12, containing the same gain medium, for generating either pulsed or continuous wave stimulating radiation, beam expanding and beam directing means 13 and 14, respectively, for introducing and directing the stimulating radiation pulse into and down the length of the longitudinal amplifier 11 through a window 11' and into means 15 for reflecting and directing the generated high energy laser pulse into a focal or target region indicated at 16. As illustrated by the arrows, the beam expanding means 13 expands the cross sectional area of the stimulating radiation pulse to at least that of the amplifier 10. The amplifier 10 includes means 17 for triggering a high magnitude energy discharge or release into or within the gain medium 11, for generating an amplification zone of population inversion in that medium, which moves down the amplifier 10 at the velocity of light in a traveling wave mode. An aligning continuous wave laser 18 generates a visible radiation beam, indicated at 19, which is combined into the beam path, indicated at 20, of the beam 21 of oscillator laser 12 by a beam splitting means 22, the combined beam 20 being directed into beam expanding means 13 via a beam directing means 23.

The basic method of operation of the inventive traveling wave laser pulse system as carried out by the FIG. 1 embodiment includes the following operational sequence: generating stimulating radiation by means of oscillator laser system 12; expanding the cross sectional area of the stimulating radiation beam to at least the cross sectional area of the longitudinal amplifier 10 by directing the beam through expanding means 13; directing the stimulating radiation longitudinally through the amplifier by directing means 17; by means 17 pumping the gain medium in the amplifier 10 in a traveling wave mode rapidly creating an amplification zone of population inversion with high energy content in the medium moving at the velocity of light along the longitudinal axis of the amplifier; and generating a visible radiation beam 19 which combined with the stimulating radiation beam 21 and directing the combined beam into the beam expanding means 13.

Figure 3:
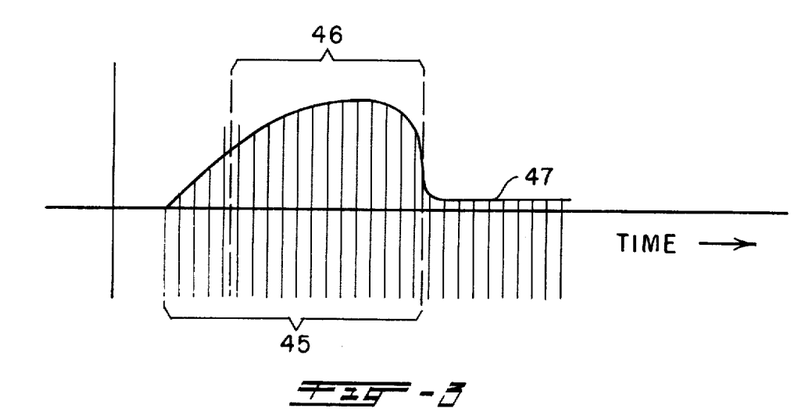

The generated stimulating radiation, hereinafter more fully described with respect to FIG. 3, can either be a pulse or a continuous wave; however, it must always be present in the moving amplification zone. The presence of the stimulating radiation in the amplification zone induces stimulated emissions, depleting the population inversion in the excited lasing energy state of the gain medium as it is generated by the pumping energy discharge or release into that zone. Hence, in essence, high degree population inversion never exists in the amplification zone. The stimulating radiation in the moving amplification zone simply gives direction to (i.e., "pilots") the stimulated emission radiations in the zone. Specifically, stimulated emission radiation is coherent with the stimulating radiation.

By way of example only, the longitudinal amplifier 10 may be constructed from material such as copper, the high gain medium 11 being excited HF, the oscillator laser system 12 being of the chemical HF type, the beam expanding means 13 consisting of a system of mirrors, the beam directing means 14 and 23 constituting aluminum coated mirrors, the reflecting and directing means 15 constituting a dielectric coated mirror, the triggering means 17 consisting of an electron beam, the aligning continuous wave laser 18 being of the He-Ne type, with the beam splitter 22 being of the dielectric mirror type.

Figure 2:
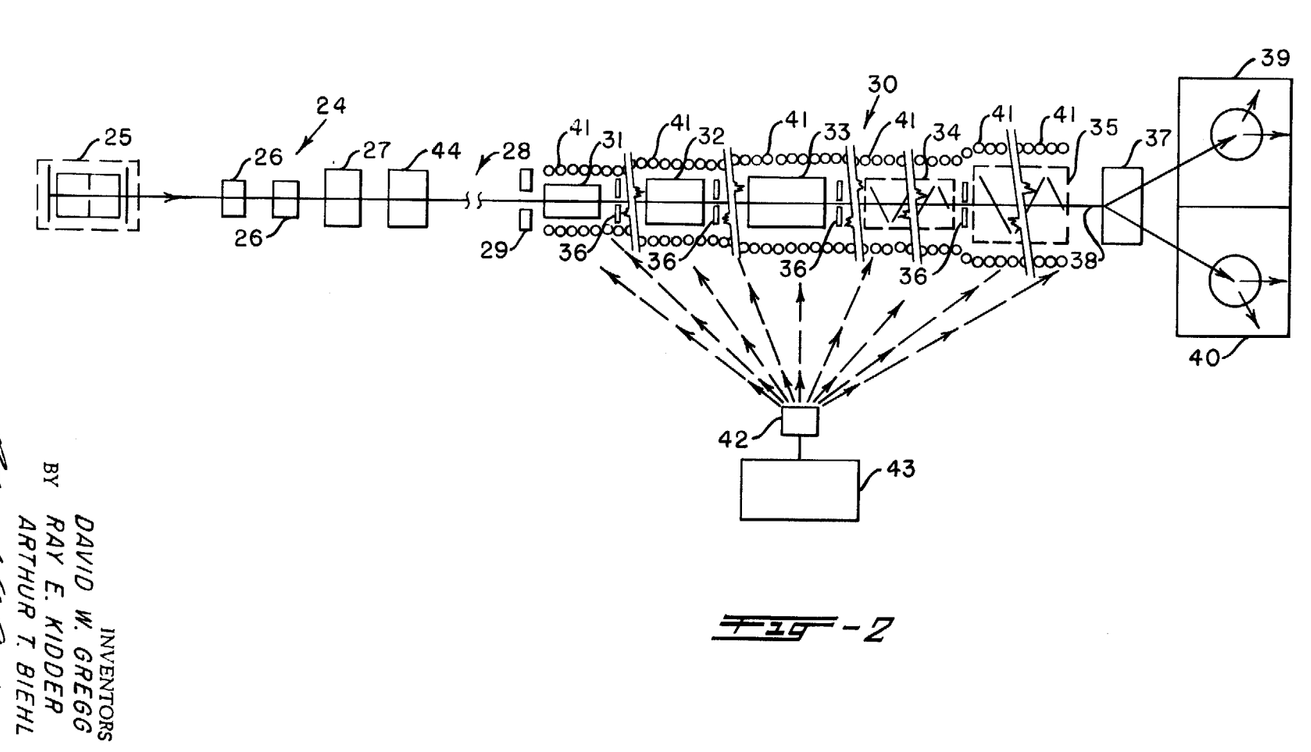
FIG. 2 is a partial block, partial schematic illustration of an embodiment of a solid state traveling wave pulse laser system in accordance with the invention.

A solid state embodiment of the inventive traveling wave laser pulse system is illustrated in FIG. 2. This system includes an oscillator laser system, generally indicated at 24, which comprises a mode-locked oscillator laser 25, a plurality of single pass amplifiers 26 (only two shown), means 27, such as a Pockels cell and polarizers, for times-shaping the generated oscillator radiation pulse, a long optical arm indicated at 28 and conventionally known in the laser art for eliminating hot spots, and an aperture means 29 for beam definition. The oscillator laser system 24 directs the output beam through aperture 29 into an amplifier, generally indicated at 30, and comprising, in series, a chain of rod amplifiers 31, 32 and 33, each of increased size compared to the previous one, and a pair of disk amplifiers 34 and 35 of increasing diameter, means 36 located between each amplifier in series for expanding the radiation beam cross section between each amplifier 33–35 of different diameters, and means 37, such as a prism for directing the output beam 38 into a pair of focal or target regions 39 and 40. While five amplifier sections are shown any desired number can be utilized. A purlality of flashlamps 41 are disposed proximate each of the solid amplifiers 31–35 perpendicular to the longitudinal axis of the entire amplifier 30. The flashlamps 41 are of the conventional type and are sequentially driven by large electrical discharges through a sequential spark gap switching means 42, such as that described in copending U.S. patent application Ser. No. 827,255, filed May 23, 1969, issued as U.S. Pat. No. 3,597,695 on Aug. 3, 1971 and assigned to the same assignee. The electrical energy for the discharge is stored in a large capacitor bank 43 per conventional practices. The sequential switch 42 fires the flashlamps 41 to generate an amplification zone of population inversion in the solid gain medium of amplifier sections 31–35 which moves down the amplifying chain, from left to right as shown, at the velocity of light in a traveling wave mode. The solid amplifier system 30 includes timing means 44 for introducing a stimulating radiation pulse from the oscillator laser 24 into the moving amplification zone in the gain medium of the amplifier 30.

The time-width of the stimulating radiation pulse should be slightly greater than the time-width of the moving amplification zone. Specifically, referring to FIG. 3, the wave front of the amplified stimulated radiation pulse 45 coincides with the front of the amplification zone 46. However, the stimulating radiation indicated at 47 precedes the front of the amplification zone 46.

Any high gain, solid lasing material is suitable for the described system. An exemplary medium is neodymium glass.

A liquid state gain medium may be substituted for the solid state gain medium as an equivalent in the FIG. 2 embodiment of the laser pulse system. The inventive amplification method is particularly adapted for solid or liquid gain mediums where the lifetime of the lasing transitions in the gain medium is short compared to the transit time of light through the amplifier system. However, the solid state system have inherent upper intensity (energy/cm$^2$) limitations set by the damage threshold of the solid gain medium. Another disadvantage of the solid state system relates to the possibility of reflections which could destroy smaller diameter (upstream) components of the system. Such reflections arise from misalignments and minuscule differences in refractive indexes.

In a traveling wave chemical gas pulse laser system in accordance with the invention, and as described in greater detail hereinbelow, the amplifier cavity thereof comprises a longitudinal vessel containing a quiescent mixture of gaseous reactants which combine in an energetic exothermic chemical reaction which has a lasing reaction species or product, which releases energy suitable for pumping that lasing species at a rate sufficient to generate an extremely large population inversion in a time interval comparable to the required time-width of a stimulated radiation emission pulse, and which can be uniformly and controllably initiated. Additional desirable properties of the exothermic chemical reaction of the explosive or reactant gaseous mixtures are low energy investment for initiation, gaseous reaction products, and complete reaction of reactants. In a preferred embodiment, the gaseous reactants combine in a branching chain explosive reaction.

Suitable explosive or reactant gas mixtures include gaseous compounds from the class $F_2$, $N_2F_4$, $XeF_4$, $SF_6$, $UF_6$, $NF_3$, $SbF_5$, $N_2F_2$, $IF_5$, $IF_7$, $BrF_5$, $BrF_7$, and other gaseous fluorinated compounds, mixed with gaseous compounds from the class $H_2$, $D_2$, $T_2$, $B_5H_9$, $CH_4$, and $B_2H_6$ and other gaseous hydrogenerated compounds. The lasing species generated by an exothermic chemical reaction of these two classes of compounds is hydrogen fluoride (HF).

The containment pressure of the quiescent gaseous reactants can range from 1 torr to many atmospheres. Specifically, in a branching chain explosive chemical reaction, the energy obtained in the laser beam per unit volume by stimulated radiative transitions (lasing) appears to be directly proportional to the pressure, based on tests thus far conducted. Accordingly, the highest possible pressures consistent with safe containment of the energy released by the explosive reaction may be desirable.

The gaseous reactants can be initiated in a traveling wave mode by means of a sequentially fired electrical discharge, a sweeping high energy electron beam, or a traveling wave high intensity radiation field generated by flashlamps. The energy released in the reaction generates an amplification zone which moves down the longitudinal amplifier vessel, similar to amplifier 10 in FIG. 1, at the speed of light in a traveling wave mode. The amplifier vessel includes radiation inlet and exit widows, as described hereinafter. Timing means introduce a stimulating radiation pulse from the oscillator laser, similar to 12 or 24 in FIGS. 1 and 2, into the zone of inversion for amplification by stimulated radiative transitions.

Figure 4:
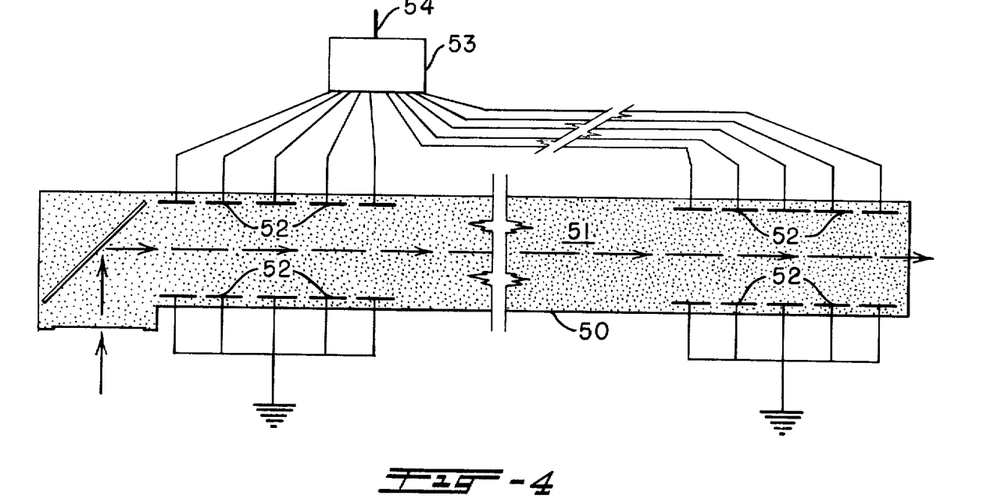
FIG. 4 schematically illustrates an embodiment of an amplifier vessel in which chemical lasing reaction is initiated in a traveling wave mode by an electrical discharge.

FIG. 4 is an embodiment of the invention for initiating the chemical reaction by a sequential electrical discharge. As illustrated, the FIG. 4 embodiment basically comprises a longitudinal amplifier vessel 50 containing an explosive gaseous mixture 51 of the compound described above, such as $H_2+N_2F_4$, a series of sparking electrodes 52 disposed along the length of the vessel 50, and a sequential switching means 53, such as the spark gap switch 42 described above with respect to FIG. 2, connected to an appropriate power source via connection 54. Actuation of the switching means 53 fires the electrodes 52 sequentially, from left to right as viewed in the drawing, creating a traveling wave mode which moves through amplifier vessel 50 at the speed of light. The electrodes 52 are designed such that a uniform electrical discharge is generated upon firing. Similarly, a series of flashlamps disposed along the length of the longitudinal amplifier vessel 50 can be sequentially fired in a traveling wave mode to initiate the reaction, thereby generating an amplification of population inversion moving at the speed of light in a traveling wave mode. A light beam as indicated by an arrow from a suitable source is directed through the amplifier 50 in a manner similar to that of the FIG. 1 embodiment.

Figure 5:
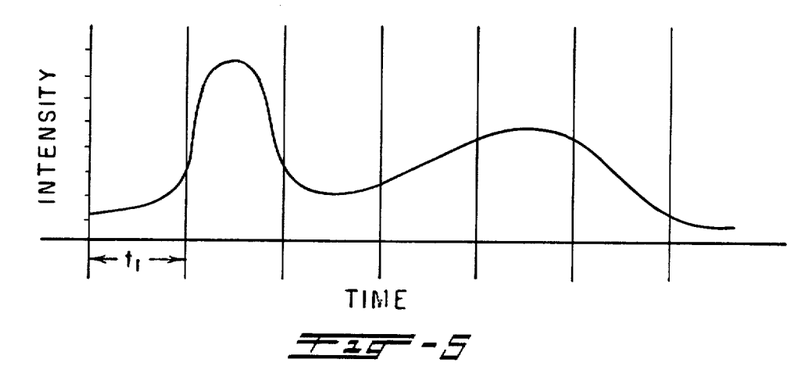
FIG. 5 is a graph showing the intensity of stimulated emission from an exothermic chemical reaction as a function of time after initiation of the reaction.
Figure 6:
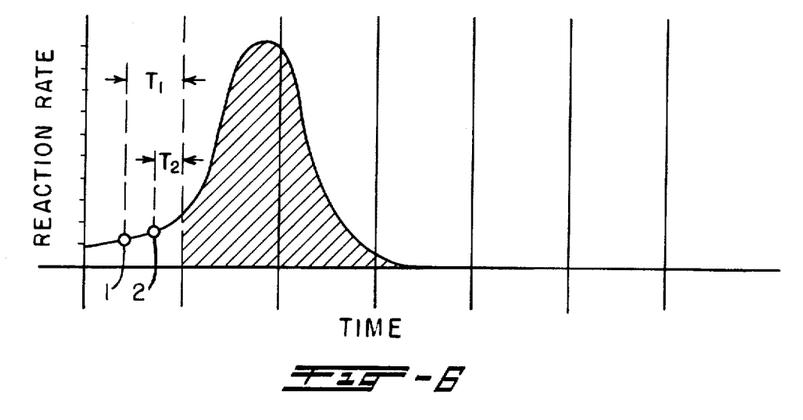
FIG. 6 is a graphic presentation illustrating the chemical reaction rate of an exemplary exothermic chemical reaction as a function of time.

A preferred method for initiating the exothermic chemical reaction in the traveling wave chemical gas pulse laser system is by means of an intense high energy electron pulse beamed coaxially down the amplifier vessel described below with respect to FIG. 7. With this method, certain compensations can be made to optimize the output pulse. Specifically, referring to the graph of FIG. 5, there is a time $t_1$ after initiation before the intensity of the stimulated emission increases sharply. More particularly, there is a time after initiation before a sufficiently high degree population inversion is generated for high intensity lasing. This time $t_1$ is a function of the composition of the reactant mixtures and of the amount of energy initiating the chemical reaction. FIG. 6 illustrates the latter relationship, which shows the reaction rate of an exemplary chemical reaction rate plotted as a function of time. The time interval in which lasing occurs is indicated by the shaded region. Points 1 and 2 on the FIG. 6 curve indicate the instantaneous rate of reaction upon initiation. The instantaneous reaction rate at initiation is dependent on the energy deposited in the reactants by the electron beam. The time intervals $T_1$ and $T_2$ are the intervals between initiation of the reactions for a particular instantaneous reaction rate at initiation and the onset of stimulated emission from the generated population inversion zone. Ideally, the instantaneous reaction rate at initiation should be constant. However, the axial electron beam loses energy as it progresses down the amplifier vessel. Accordingly, the time interval $t_1$ (see FIG. 5) between initiation and the onslaught of lasing lengthens as the initiating electron pulse progresses down the vessel. The effect is to slow the velocity of the amplifying population inversion zone to below the speed of light. Accordingly, it is possible that the simulated radiation wave front will overtake the front of the amplification zone (see FIG. 3), hence broadening the time-width and decreasing the peak intensity of the generated traveling wave laser pulse. Moreover, the axial electron beam pulse moves at a velocity slightly less than the speed of light (0.95 C).

To compensate for these effects, the composition of the gaseous mixture of reactants can be varied along the length of the amplifier vessel. For example, the $t_1$ of an $H_2+N_2F_4$ mixture is greater than the $t_1$ of a $B_5H_9+N_2F_4$ mixture. Accordingly, in a system containing mixtures of $H_2+B_5H_9$ and $N_2F_4$, by controlling the mixture ratios of $H_2$ to $B_5H_9$ as a function of the length of the containment vessel, a constant $t_1$ in the moving reaction zone can be obtained. However, to compensate for the slower speed of the initiating electron beam pulse, one must vary the mixture ratios of $H_2$ in an $H_2+B_5H_9+N_2F_4$ system in such a manner that the $t_1$ in the reaction zone gradually decreases as the initiation front progresses down the vessel. In this fashion, the population inversion zone can move at the speed of light or even faster. To obtain the desired mixture ratios of $H_2$ to $B_5H_9$ in a $N_2F_4+H_2$ and $B_5H_9$ chemical system, the gaseous reactants may be metered into one end of the evacuated amplifier vessel. The introduced gases flow down the vessel, maintaining approximately the same mixture ratio that existed at the time of introduction. As the vessel fills up, the mixture ratio is gradaully changed in accordance with the teaching set forth above to get the desired mixture ratio gradient along the length of the vessel. Other methods include obtaining the desired mixture ratio gradient along the length of the cavity of the vessel by means of a plurality of inlets spaced longitudinally along the amplifier vessel. It is apparent that a mixture ratio gradient along the length of the containment vesel will not remain constant. Accordingly, a traveling wave chemical gas laser pulse system which use the above described method for initiating the traveling wave reaction must be fired as soon as possible after filling the containment vessel with the reactant gases.

Figure 7:
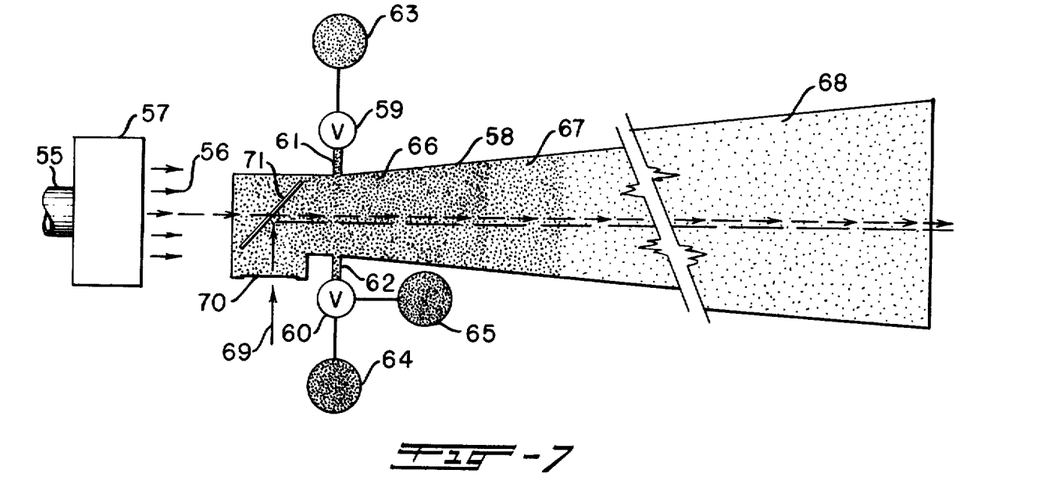
FIG. 7 is a schematic view of an amplifier for a traveling wave chemical gas laser pulse system in accordance with the invention.

FIG. 7 is an embodiment of a method utilizing an electron beam for initiating the exothermic chemical reaction in a traveling wave pulse laser in accordance with the invention. As shown, the system comprises an electron beam generating means 55, such as an accelerator, which directs a high energy beam or pulse, indicated at 56, through a beam expanding means 57 through a longitudinal amplifier or containment vessel generally indicated at 58 having a cone-like configured portion for accommodating expansion of the electron beam 56 and compensating for the increased intensity of the generated traveling wave laser pulse as it travels down the amplifier vessel 58. A pair of metering valves 59 and 60 are connected through conduits 61 and 62, respectively, to vessel 58 at the base of the cone-like portion thereof, valve 59 being connected to a reservoir 63, while valve 60 is connected to reservoirs 64 and 65. For example, reservoir 63 may contain $N_2F_4$, with reservoirs 64 and 65 containing $H_2$ and $B_5H_9$, respectively, whereby metered actuation of valves 59 and 60 control the proportions of the reactant gases from reservoirs 63, 64 and 65 directed through conduits 61 and 62 into a reactant region 66 of amplifier vessel 58. In addition to region 66, vessel 58 contains an amplification zone 67 and an unreacted region 68. A light beam indicated at 69 passes through a light transparent window 70 in vessel 58 and is directed longitudinally through amplifier vessel 58 by beam directing means 71.

While only one pair of metering valves have been shown, a plurality of such valve can be located along the length of the region 66 to direct various types and amounts of the gaseous medium into region 66 to provide the desired reaction.

The operation of the FIG. 7 embodiment, is believed to be readily apparent from the foregoing description, and therefor is not set forth in detail.

Figure 8:
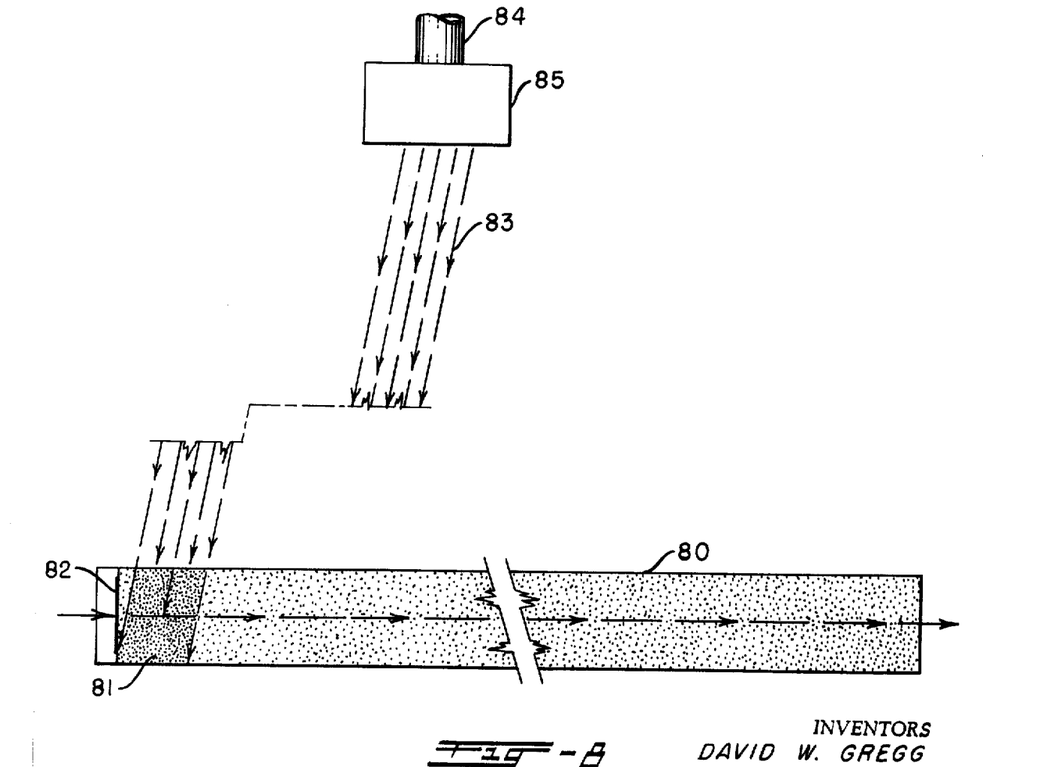
FIG. 8 schematically illustrates means for generating and sweeping a traverse high energy electron beam down a longitudinal amplifier cavity in accordance with the invention for initiating a high energy discharge or release therein.

The FIG. 8 embodiment illustrates a containment amplifier vessel 80 containing a desired explosive gaseous compound 81, such as $H_2+N_2F_4$, with a light beam, indicated by the arrows, from a suitable light source such as in the FIG. 1 embodiment, is directed by suitable means, such as in FIG. 1, through a window 82 transparent to light and through the length of amplifier 80. A traverse high energy electron beam 83 from a generating means 84 is swept the length of the containment amplifier vessel 80 by a magnetic field means 85 to volumetrically initiate the reaction of the gaseous compound 81 in a traveling wave mode moving at the velocity of light. Specifically, the beam 83 of monochromatic high energy electrons is shaped per conventional techniques such that the beams vertical dimensions equals the vertical dimension of the vessel 80, and its traverse dimension (parallel the axis of the vessel) is tailored for optimum initiation of the reaction for maximizing the magnitude of population inversion in the lasing reaction species or product. In this embodiment, the electron beam must penetrate through the vessel walls, and thus the vessel must be constructed of material transparent to the electron beam.

Figure 9:
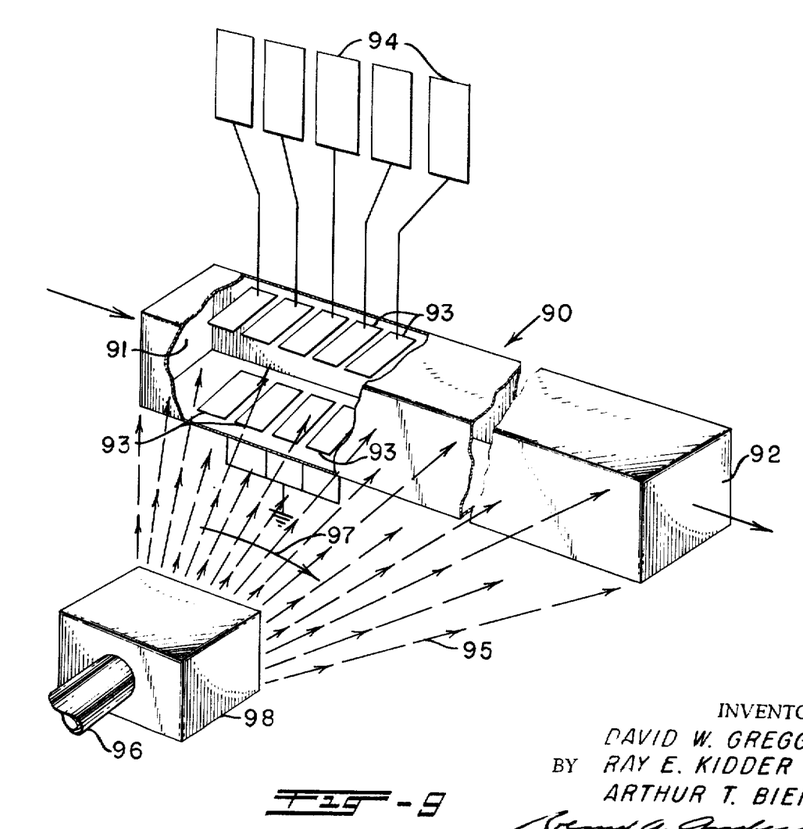
FIG. 9 schematically depicts an embodiment of the amplifier vessel for the electron beam-initiated electrical discharge traveling wave laser pulse system.

FIG. 9 illustrates an electron beam-triggered electrical discharge embodiment of the inventive traveling wave pulse laser system. In this embodiment, a longitudinal amplifier vessel 90 is provided with inlet and exit radiation windows 91 and 92 through which a suitable light beam passes, as indicated by the arrows. A series of parallel electrodes 93 are positioned along the length of the vessel 90. Each electrode 93 is electrically connected in parallel with large electrical energy storage capacitor banks 94. The vessel 90 contains nonreactive gaseous lasing species, such as $CO_2$, $N_2$ and He, at pressures which range from 10 torr to many atmospheres, such as 10. Each capacitor bank 94 is charged by means not shown to a voltage such that the potential between the electrodes 93 is slightly less than the ionization breakdown threshold of the gaseous lasing medium within vessel 90. A traverse high energy electron beam 95, generated by means 96, is swept, as indicated by arrow 97, at the velocity of light down the length of the longitudinal vessel 90 by magnetic field means 98, such as a ramp driven electromagnet. The electron beam is sufficiently energetic to penetrate the vessel wall into the region between the parallel electrodes 93, and depositing sufficient electrical energy in the lasing medium to trigger a uniform energetic electrical discharge between the electrodes. The electrical discharge generates an amplification zone of population inversion in the lasing species, which moves down the vessel 90 at the velocity of light in a traveling wave mode. The stimulating radiation pulse, indicated by the arrows through windows 91 and 92, is introduced into this zone by suitable timing means, not shown, but similar to that of the FIG. 2 embodiment, whereupon it is amplified to an extremely high energy by stimulated radiative transition in the inversion zone as the stimulating radiation pulse within the zone moves down the vessel. The amplified pulse exists from the radiation window 92 to impinge on a target.

The latter embodiments (FIGS. 7–9) of the inventive laser pulse system can amplify a stimilating radiation pulse to an almost unlimited energy. Specifically, in the chemical system, the lasing energy obtainable per unit volume is directly proportional to the pressure. The pressure is limited both by safety considerations relating to containment of the explosive energy, and by the required stimulated radiation pulse width. The only limits on the length of the containment vessel are the points where the intensity of the generated laser pulse either ionizes the gaseous medium or the exit window in a manner so as to absorb a large fraction of the stimulated radiation energy. However, the diameter of the vessel can be increased in a "cone-like" configuration, as in FIG. 7, or over the entire length, to increase the total energy of stimulated emission radiation, while maintaining a tolerably low power density. The generated laser pulse energy in the electron beam-triggered electrical discharge embodiment can likewise be increased by increasing the pressure of the gaseous lasing species and/or increasing the length diameter of the containment vessel.

In the described embodiments of the traveling wave laser pulse system, both the time-width and rise time of the generated high energy laser pulse is determined by the time-width and rise time of the moving amplification zone in the gain medium.

The exit energy of the amplified laser pulse in the latter gaseous embodiments of the novel traveling wave laser pulse system will often be above the damage threshold of most solid materials. Accordingly, the exit windows on the containment vessels are composed of a relatively thin material, sufficiently strong to withstand the internal quiescent gas pressure within the vessel without distortion, but which is very transparent to the generated laser radiation pulse. The radiation window is adaptable for replacement if destroyed by the generated laser radiation pulse.

The intense high power radiation pulse exiting from the inventive wave laser pulse system can be utilized wherever a high intensity, high power directed energy source is required. Specifically, the generated high intensity, high power radiation pulse can be reflected from a focusing, reflecting surface integral to the containment vessel, to impinge on an object in the focal region of that surface. The focal region of the system, in the FIG. 1 embodiment, is separated from the amplifier vessel by an exit window. Alternatively, the radiation pulse in FIG. 1 could exit from the containment vessel, and then pass through, or impinge on, a focusing means for directing radiation to strike an object in a small focal region. The inventive laser system, for example, could be utilized to induce thermonuclear reaction, for peaceful as well as military applications. Other applications include welding, inter-space signaling devices, and spectral analysis of distant gaseous sources.

It has therefore been shown that the present invention substantially advances the state of the laser art by providing a method and means for producing traveling wave laser pulse of almost unlimited energy content, this being accomplished by pumping a lasing medium by a traveling wave which moves with essentially the speed of light in the presence of an emission stimulating pilot light beam, especially where the length of the medium is large compared with the desired laser pulse width, and the pumping wave length comparable to the laser pulse width.

While particular embodiments of the invention have been illustrated and described, modifications will become apparent to those skilled in that art, and it is intended to cover in the appended claims all such modifications as come within the spirit and scope of the invention.

What we claim is:

1. A method of generating a traveling wave laser pulse comprising the steps of: generating a beam of stimulating radiation; containing in a longitudinal vessel a quantity of gain medium composed of a reactant gaseous mixture capable of producing an exothermic chemical lasing reaction; directing the stimulating radiation longitudinally through the thus contained gain medium; pumping the gain medium in a traveling wave mode creating an amplification zone of population inversion in the gain medium, the stimulating radiation moving with the amplification zone at substantially the velocity of light through the gain medium stimulating a traveling coherent, directed radiation pulse moving with the amplification zone through the thus contained gain medium which is amplified by the stimulated radiation transitions in the amplification zone as it moves through the gain medium.

2. The method defined in claim 1, wherein the beam of stimulating radiation is selected from the group consisting of pulsed radiation or continuous radiation.

3. The method defined in claim 1, additionally including the step of expanding the cross sectional area of the beam of stimulating radiation to at least the cross sectional area of the thus contained gain medium through which the beam is directed.

4. The method defined in claim 1, additionally including the step of combining the beam of stimulating radiation with a visible radiation beam to enable alignment of the stimulating radiation by visual examination.

5. The method defined in claim 1, additionally including the step of directing the generated amplified beam into a focal region.

6. The method defined in claim 1, wherein the step of pumping the gain medium is accomplished by triggering an energy discharge into the gain medium.

7. The method defined in claim 1, wherein the step of pumping the gain medium is accomplished by initiating a sequential uniform electrical discharge through the gain medium from a series of sparking electrode means located along the longitudinal length of the thus contained gain medium.

8. The method defined in claim 1, wherein the step of pumping the gain medium is accomplished by directing an electron beam through the thus contained gain medium.

9. The method defined in claim 1, wherein the step of pumping the gain medium is accomplished by sweeping an electron beam across the gain medium.

10. The method defined in claim 1, additionally including the step of selectively changing the composition of the gain medium.

11. A traveling wave laser system comprising: means for generating at least a pulse of stimulating radiation; a longitudinal containment vessel containing a gain medium composed of a reactant gaseous mixture which combines in an energetic exothermic chemical lasing reaction; means for directing the stimulating radiation from said generating means longitudinally through said gain medium; and means for pumping said gain medium in a traveling wave mode creating in the containment vessel an amplification zone of population inversion in the gain medium moving at substantially the velocity of light through the gain medium, thereby generating at least a pulse of traveling coherent, directed radiation moving with the amplification zone through the gain medium and creating an energy output.

12. The system defined in claim 11, additionally including means for expanding the stimulating radiation cross sectional area to at least the longitudinal containment vessel cross sectional area.

13. The system defined in claim 11, wherein the stimulating radiation is selected from the group consisting of pulsed radiation or continuous wave radiation.

14. The system defined in claim 11, additionally including means for generating a visible radiation beam, and means for combining the visible radiation beam with the stimulating radiation, thereby enabling alignment of the stimulating radiation by visual examination.

15. The system defined in claim 11, wherein said stimulating radiation generating means comprises an oscillator laser system.

16. The system defined in claim 11, additionally including means for directing the generated energy output into a focal region.

17. The system defined in claim 11, wherein said gain medium pumping means comprises means for directing an energy discharge into said medium.

18. The system defined in claim 11, wherein said gain medium pumping means includes a series of parallel electrode means positioned along at least a portion of the longitudinal length of said containment vessel, means for producing an electrical potential across said electrode means, and means for sequentially actuating said electrode means.

19. The system defined in claim 11, wherein said gain medium pumping means includes an electron generating means directing the output thereof through said gain medium.

20. The system defined in claim 19, wherein said gain medium pumping means additionally includes means for sweeping the output from said electron generating means across at least a portion of the longitudinal length of said containment vessel.

21. The system defined in claim 11, wherein said longitudinal containment vessel is provided with a cone shaped portion.

22. The system defined in claim 21, additionally including means operatively connected to said vessel for changing the composition of said gaseous mixture.

23. The system defined in claim 22, wherein said gaseous mixture composition changing means includes a plurality of reservoirs, each of said reservoirs being adapted to contain a gaseous medium, and means for selectively directing gaseous medium from said reservoirs into said containment vessel.

24. The system defined in claim 23, wherein said gaseous medium in at least one of said reservoirs is selected from the group consisting of $F_2$, $N_2F_4$, $X_2F_4$, $SF_6$, $UF_6$, $NF_3$, $SbF_5$, $N_2F_2$, $IF_5$, $IF_7$, $BrF_5$ and $BrF_7$; and wherein said gaseous medium in at least another one of said reservoirs is selected from the group consisting of $H_2$, $D_2$, $T_2$, $CH_4$, $B_2H_6$, and $B_5H_9$.

25. The system defined in claim 11, wherein said gain medium includes at least one gaseous compound selected from the group consisting of $F_2N_2F_4$, $X_2F_4$, $SF_6$, $UF_6$, $SbF_5$, $N_2F_2$, $IF_5$, $IF_7$, $BrF_5$ and $BrF_7$ mixed with at least one gaseous compound selected from the group consisting of $H_2$, $D_2$, $T_2$, $CH_4$, $B_2H_6$, and $B_5H_9$.

26. The system defined in claim 25, additionally including means operatively connected with said longitudinal containment vessel for containing at least one compound of each of said groups, and means for selectively directing said contained compounds into said amplifying means for changing the composition of said gain medium therein.

* * * * *